United States Patent
Chliwnyj et al.

(10) Patent No.: US 6,462,899 B1
(45) Date of Patent: Oct. 8, 2002

(54) INITIALIZATION AND CALIBRATION OF A RECORDING SYSTEM TRACK FOLLOWING SERVO

(75) Inventors: Alex Chliwnyj; John James Gniewek, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,558

(22) Filed: Jan. 4, 2000

(51) Int. Cl.[7] ............................................. G11B 5/584
(52) U.S. Cl. .................................. 360/77.12; 360/78.02
(58) Field of Search ........................ 360/77.12, 78.02, 360/75, 27, 77.01, 78.01, 48

(56) References Cited

U.S. PATENT DOCUMENTS

| | | | |
|---|---|---|---|
| 5,055,951 A | 10/1991 | Behr | 360/77.12 |
| 5,068,757 A | 11/1991 | Hughes et al. | 360/77.13 |
| 5,432,652 A | * 7/1995 | Comeaux et al. | 360/77.12 |
| 5,448,430 A | 9/1995 | Bailey et al. | 360/77.12 |
| 5,574,602 A | * 11/1996 | Baca et al. | 360/77.12 |
| 5,629,813 A | 5/1997 | Baca et al. | 360/77.12 |
| 5,661,616 A | 8/1997 | Tran et al. | 360/77.12 |
| 5,872,672 A | 2/1999 | Chliwnyj et al. | 360/77.12 |
| 5,923,494 A | 7/1999 | Arisaka et al. | 360/78.02 |

* cited by examiner

Primary Examiner—Andrew L. Sniezek
(74) Attorney, Agent, or Firm—John H. Holcombe

(57) ABSTRACT

A servo system and method for initializing and calibrating a track following servo for following an index servo position displaced laterally from an edge, the edge comprising the interface between two dissimilar servo signals. A servo head is moveable laterally and a servo detector determines a ratio related to the two dissimilar recorded servo signals, the ratio representing the lateral position of the servo head with respect to the edge. An independent position sensor determines the mechanical lateral position of the servo head. The servo head is nominally aligned at a lateral position at which the servo detector provides a ratio representing the edge. The mechanical lateral position of the independent position sensor is measured at the nominal alignment of the servo head. Then, the servo head is repositioned laterally the predetermined displacement distance from the nominal alignment as determined by the independent position sensor. The repositioned ratio of the servo signals is measured at the displaced distance, comprising index ratio for initializing and calibrating the track following servo.

26 Claims, 8 Drawing Sheets

INITIALIZATION AND CALIBRATION OF A RECORDING SYSTEM TRACK FOLLOWING SERVO

DOCUMENTS INCORPORATED BY REFERENCE

Commonly assigned U.S. Pat. No. 5,448,430 is incorporated for its showing of a track following servo system for following servo track edges of dissimilar servo signals, commonly assigned U.S. Pat. No. 5,844,814 is incorporated for its showing of an independent position sensor in a head positioning system, and commonly assigned U.S. Patent Application (Ser. No. 09/413,327) is incorporated for its showing of a servo position detector and a method for detecting and following an index servo position displaced with respect to an edge of a servo track.

FIELD OF THE INVENTION

This invention relates to recording system track following servos, and, more particularly, to the initialization and calibration of indexed servo positions displaced from servo track edges.

BACKGROUND OF THE INVENTION

Advancements in technology in the data storage industry often include increases in the data storage capacity of given data storage media. One means of increasing the data storage capacity of data storage media, such as magnetic tape cartridges or magnetic tape cassettes, is to increase the track density of the data storage media.

In a typical magnetic tape, data is recorded in a plurality of parallel, longitudinal data tracks. A tape head may have a plurality of data heads which have fewer numbers of read/write elements than tracks. The data tracks are divided into groups, typically interleaved, and the tape head is indexed laterally with respect to the tracks to access each group of data tracks. In order to properly register the read/write elements with the data tracks, prerecorded servo tracks are provided which are parallel to the data tracks. A servo head located at an indexed position with respect to the read/write elements reads the servo tracks. The servo tracks provide lateral positioning information which, when read by the servo head, can be detected by a servo detector to indicate whether the servo read head is correctly positioned with respect to the servo tracks. Thus, the servo head can be moved laterally to a desired position with respect to the servo tracks so as to properly register the read/write elements with respect to a desired group of data tracks. Then, the servo head can follow the servo tracks as the media and the head are moved longitudinally with respect to each other, so that the read/write elements maintain registration with the data tracks. Typically, the servo head follows servo tracks at an edge, an edge comprising an interface between two dissimilar recorded servo signals.

The incorporated (Ser. No. 09/413,327) application utilizes existing servo tracks having edges, but increases the data track density by employing index servo positions displaced from the edges. Effectively, the index servo position is the lateral position on the tape at which the center of the servo read head is located, and this position is laterally displaced from an edge. The edges are easily tracked in the conventional servo systems by tracking the point at which both the dissimilar signals are sensed by a servo detector as balanced, in effect relying on the photolithography of the recording elements that generated the servo track edges. An example of a servo track following system for tracking edges is illustrated by the incorporated '430 patent.

As pointed out by the incorporated (TU999049) application, tracking at a displacement from an edge is much more difficult. The index position is at a predetermined displacement distance in a lateral direction from an edge. The servo system servo detector determines the ratio between the two dissimilar recorded servo signals read by the servo head, with the ratio, the ratio representing the lateral position of the servo head with respect to an edge. The servo system then moves the servo head laterally to follow the index position, with the servo detector indicating a ratio of the two dissimilar recorded servo signals that is at an offset from the balanced ratio, the ratio representing the desired index servo position. To track follow at a displaced index position requires a high resolution servo detector that can interpolate the dissimilar recorded servo signals. The dissimilar servo signals are prerecorded onto the media, but are subject to variation in amplitude and possibly placement from one data storage media to the next.

Initializing and calibrating the servo detector to provide a correct interpolation of the recorded dissimilar recorded servo signals therefore becomes difficult.

SUMMARY OF THE INVENTION

An object of the present invention is to provide an initialization and calibration sequence that enables a more precise track following alignment of a servo head for following an index servo position displaced laterally from an edge.

Disclosed are a servo system and method for initializing and calibrating at least one index servo track following position substantially parallel to the edges and displaced a predetermined displacement distance in a lateral direction from one of the edges, in accordance with the present invention. A servo head is moveable in the lateral direction with respect to the recording medium and a servo detector is coupled to the servo head for determining a ratio related to the two dissimilar recorded servo signals as read by the servo head, the ratio representing the lateral position of the center of the servo head with respect to one of the edges. A servo track follower is coupled to the servo detector for moving the servo head laterally, the servo track follower, once initialized and calibrated, following an index ratio of the two dissimilar recorded servo signals representing the index servo position. An independent position sensor is provided for determining the mechanical lateral position of the servo head with respect to the recording medium.

In accordance with an embodiment of the present invention, logic, coupled to the servo detector, the servo track follower and the independent position sensor, responds to the servo detector and operates the servo track follower to nominally align the servo head at a lateral position at which the servo detector provided ratio represents one of the edges. The logic measures the mechanical lateral position of the independent position sensor at the nominal alignment of the servo head. The logic then responds to the independent position sensor, operating the servo track follower to reposition the servo head laterally the predetermined displacement distance from the nominal alignment as determined by the independent position sensor. The logic measures the servo detector provided repositioned ratio of the servo signals at the displaced distance, the logic initializing and calibrating the servo track follower to employ the provided repositioned ratio as the index ratio. Thus, track following at the provided index ratio insures that the servo head is at the correct displacement from the edge.

Additionally, if the servo system comprises a plurality of servo heads having the same alignment as a plurality of the prerecorded servo tracks, the nominal alignment of the servo heads at the corresponding edges comprises aligning the servo heads at a lateral position at which the servo detector provided ratio comprises the average of the provided ratios from the plurality of servo heads, the average representing the corresponding edges of the servo tracks. Then, the measurement of the repositioned ratio of the servo signals comprises measuring the average of the servo detector provided repositioned ratios from the plurality of servo heads.

In accordance with another embodiment of the present invention, a check on the edge measurement may be made during the initialization and calibration of index servo positions displaced substantially equidistant in opposite lateral directions from one of the edges. The servo head is again repositioned in the opposite lateral direction from the repositioning step, to the predetermined displacement distance from the nominal alignment as determined by the independent position sensor. The logic measures the again repositioned ratio of the servo signals. Thus, the repositioned ratio represents the displacement at one side of the edge, and the again repositioned ratio represents the displacement at the other side of the edge. The logic determines a midpoint between the repositioned ratio and the again repositioned ratio, compares the midpoint to the nominally aligned ratio, and determines whether the compared ratios are within a predetermined range. If so, the nominal alignment was correct, and the logic initializes and calibrates the servo detector to employ the provided repositioned ratio and the again repositioned ratio as the index ratios for the oppositely displaced index servo positions.

The repositioned locations can also be checked in accordance with the present invention. As a check, the servo head is further repositioned laterally in opposite directions from the repositioned displacement, the further repositioning comprising a substantially equal displacement in the opposite directions, the displacement a fraction of the predetermined displacement distance as determined by the independent position sensor. The logic measures the servo detector provided ratios of the servo signals at the further repositioned displacements, and determines a further midpoint between the opposite further repositioned ratios. The logic compares the further midpoint to the repositioned ratio, determining whether the compared ratios are within a predetermined range of each other. If so, the repositioned ratio is correct, and the logic conducts the initializing and calibrating step.

Hence, the present invention provides an initialization and calibration sequence that enables a more precise track following alignment of a servo head for following an index servo position displaced laterally from an edge.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
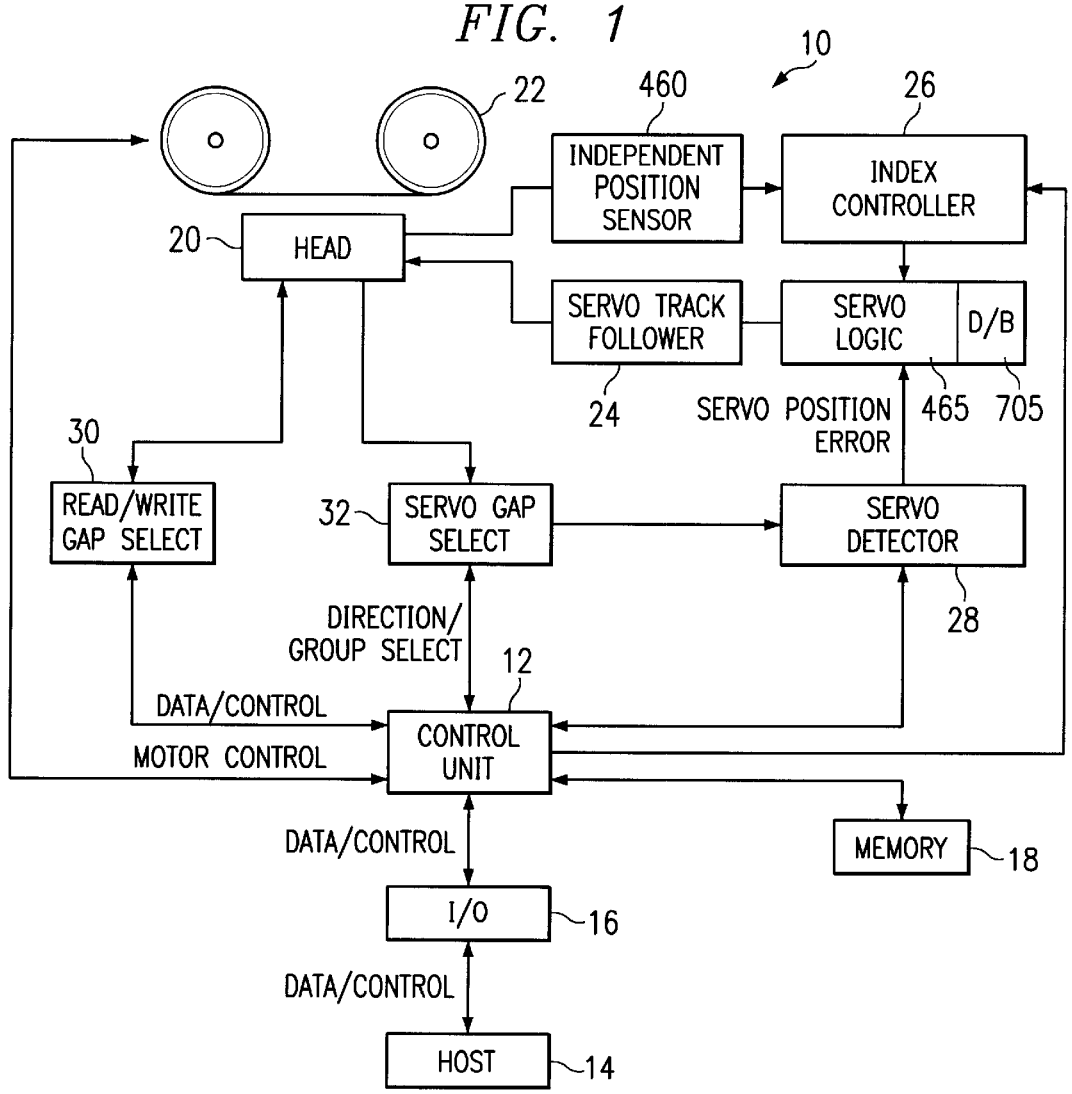
FIG. 1 is a block diagram of a magnetic tape system employing the present invention.

Referring to FIG. 1, a data storage system 10, such as a magnetic tape system, is illustrated. An example of a magnetic tape system in which the track following servo initialization and calibration system of the present invention may be employed is the IBM 3590 magnetic tape subsystem. A control unit 12 is provided to and from which data and control signals are transmitted from and to a host device 14 through an interface 16. The control unit 12 is coupled to a memory device 18, such a random access memory for storing information and computer programs. An example of a control unit 12 comprises an IBM RS/6000 processor.

A multi-element magnetic tape head 20, such as is well known in the art, includes a plurality of data read/write elements to record and read data onto and from a magnetic tape 22, and servo heads or read elements to read servo signals comprising prerecorded servo tracks on the tape 22.

A tape reel motor system (not shown) of the tape drive moves the tape 22 in the longitudinal direction, and a servo track follower 24 directs the motion of the head 20 in a lateral or transverse direction relative to the longitudinal direction of tape motion. The control unit 12 is coupled to the tape reel motors and controls the direction, velocity and acceleration of the tape 22 in the longitudinal direction.

The data tracks on the tape 22 are arranged in parallel and are parallel to the servo tracks. Thus, as the servo track follower 24 causes a servo head to track follow a servo track, the data read/write elements track a parallel group of the data tracks. If it is desired to track another parallel group of data tracks, the head 20 is indexed laterally so that the same servo head is aligned with another servo track, or a different servo head is aligned with the same or a different servo track.

When the head 20 is to be moved to a selected index position, an index controller 26 is enabled by the control unit 12, receiving a mechanical lateral position signal from an independent position sensor 460 and transmits an appropriate signal to servo logic 465 to select the appropriate servo track, while the control unit 12 transmits an appropriate signal to a servo gap selector 32 to select the appropriate servo head. The independent position sensor 460 is discussed in the incorporated U.S. Pat. No. 5,844,814, and indicates the lateral mechanical position of the head 20 with respect to the magnetic tape. The logic 465 operates the servo track follower 24 in accordance with the present invention to initialize and calibrate the servo head at various lateral displacements with respect to the selected servo tracks and track follow at the desired lateral displacements from the track, as will be explained. The logic 465 may comprise a programmed PROM, ASIC or microprocessor. The tape system 10 may be bidirectional, in which ones of the read/write elements are selected for one direction of movement, and others of the read/write elements are selected for the opposite direction of movement. The control unit 12 additionally selects the appropriate ones of the read/write elements by transmitting a signal to a read/write gap select unit 30. In accordance with the present invention, servo logic 465 employs the servo information detected by a servo detector 28 and the mechanical positioning information from the independent position sensor 460 to initialize and calibrate the track following servo. The track following servo is also implemented in the servo logic 465, and may comprise the servo of the incorporated (Ser. No. 09/413,327) application, employing the detected servo information to determine the positioning error information and provide the positioning information to the servo track follower 24 to align and maintain the alignment of the selected servo head to the selected displacement from the selected servo tracks.

Figure 2:
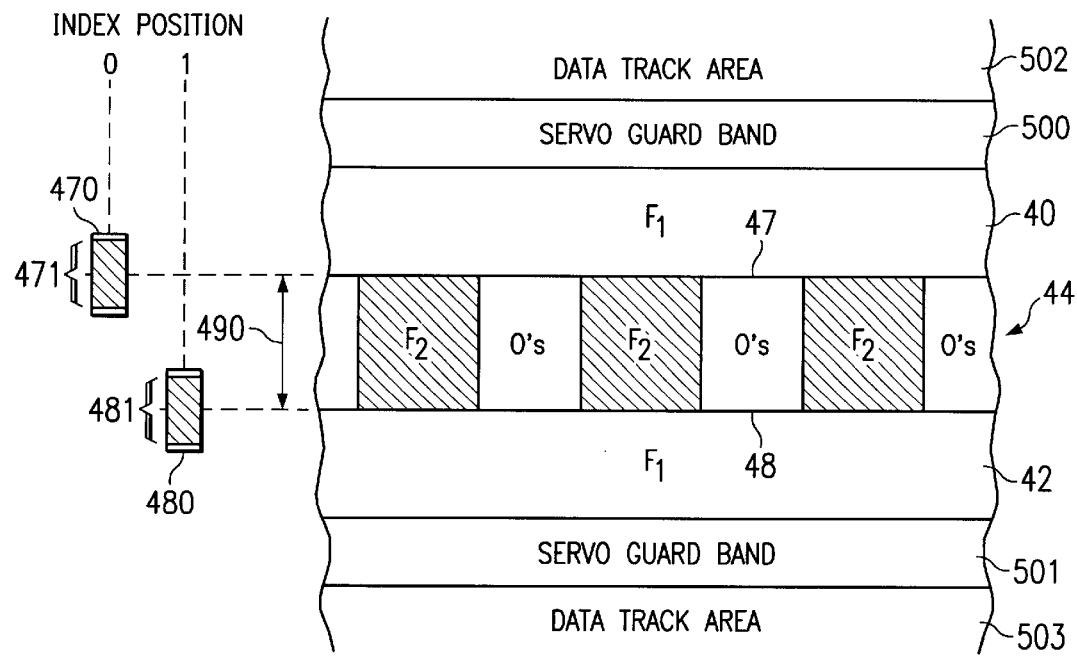
FIG. 2 is a diagrammatic representation of a magnetic tape format of two servo positions of the prior art with a servo track having two edges of dissimilar servo signals.

FIG. 2 illustrates a prior art magnetic tape format of two adjoining servo signals 47 and 48, called "edges", in a combined servo track, together with prior art servo heads or read elements 470 and 480 having active sensing regions 471 and 481. The combined prerecorded servo track comprises two dissimilar servo signals, one servo signal at outer bands 40 and 42, having a recorded pattern of a constant amplitude signal of a single first frequency, on either side of an inner band 44 of the other servo signal, having a recorded pattern alternating between a constant amplitude burst signal 45 of a single second frequency and a zero amplitude null signal 46.

Two servo edges 47 and 48 are represented. An "edge" comprises an interface between the two dissimilar servo signals. When a servo head is centered on servo edge 47 or on servo edge 48, the resultant signal read by the servo head element is a maximum signal comprising the first frequency signal combined with the second frequency burst signal, alternating with a minimum signal comprising the first frequency signal combined with the null signal. If the servo head is correctly centered on the edge of the adjoining servo tracks, this is called the "centered on-edge ratio", and the ratio of the amplitude of the combined first and second frequency signals is twice the amplitude of the combined first and null signals. This amplitude ratio is called the 1/2 ratio. Incorporated U.S. Pat. No. 5,448,430 illustrates the above discussed servo track patterns and describes a track following servo positioning system employing envelope detection to determine the maximum and minimum signals.

Typically, the combined servo track 40–44 is provided with servo guard bands 500 and 501 to protect the outer bands. 40 and 42 from noise resulting from the data track areas 502 and 503. The prior art servo read elements 470 and 480 have the smallest possible active sensing regions 471 and 481 to increase the signal to noise ratio for peak detection.

The prior art servo track edges 47 and 48 are separated by a predetermined distance 490, employed for manufacturing of the magnetic tape and servo tracks. Two index positions are allowed for the servo track, each centered on one of the edges 47 and 48. The data track density is increased by providing additional servo heads elements at shifted positions, so that the other read elements may be indexed to the index positions.

In accordance with the incorporated (Ser. No. 09/413,327) application, as illustrated in FIG. 3, the servo tracks are unchanged, but the data tracks are positioned in a more dense arrangement.

The combined servo track has the recorded pattern of a constant amplitude signal of a single first frequency, on either side of the inner band 44, which alternates between a constant amplitude burst signal and a zero amplitude null signal to provide the two servo edges 47 and 48. The edges 47 and 48 are separated by the predetermined distance 490. Now, however, the data tracks are aligned so that a servo head may be displaced laterally from an edge 47 or 48 so as to provide a higher track density. For example, the displaced alignment of the center of the servo head may be located along lines 55–58 about one quarter the width of the inner band 44 away from the servo edge centerline in either direction, providing four index positions. Additionally, the servo heads are substantially the same sensing width as the predetermined distance 490. In order to center the data read/write elements in the "0" and "3" index positions, the servo head must be located at position 505 or at position 508, and will read a minimum signal that has an amplitude of about ¾ of the maximum signal, and to center the data read/write elements in the "1" and "2" index positions, the servo head must be located at position 506 or at position 507, and will read a minimum signal that is about ¼ of the maximum signal. As the result, a single servo head, rather than track following up to two servo edges 47 and 48, now tracks four displaced index servo positions 55–58, effectively doubling the data density for the existing servo tracks.

Figure 4:
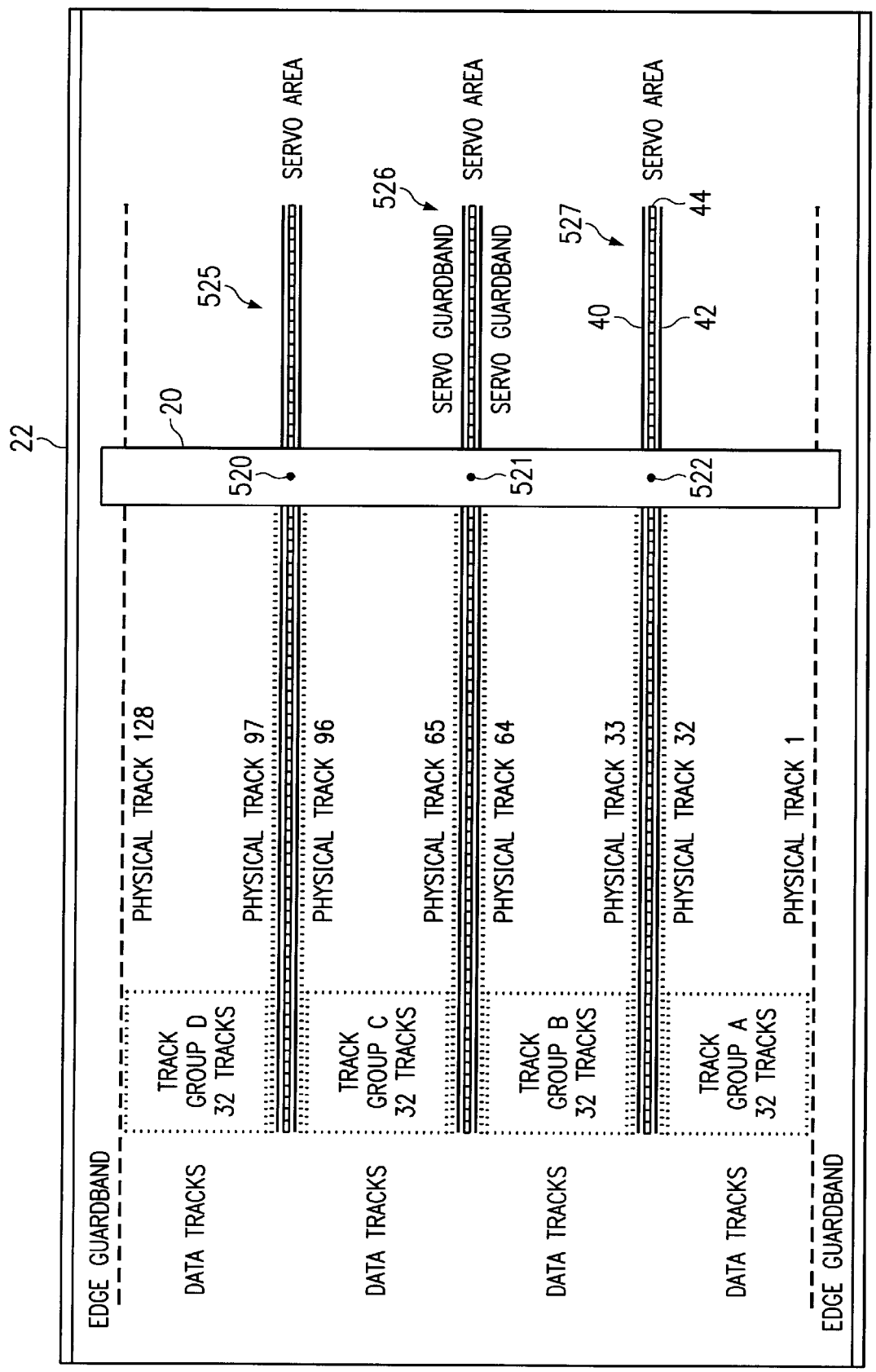
FIG. 4 is a diagrammatic illustration of a magnetic tape having three separate servo track areas.

Additionally, referring to FIG. 4, a plurality of servo heads 520–522 are spaced apart in the head 20 to sense the two dissimilar signals at each corresponding edge of servo tracks 525–527. Then, the corresponding sensed two dissimilar signals of each of the servo heads are averaged to reduce the effect of noise.

Figure 3:
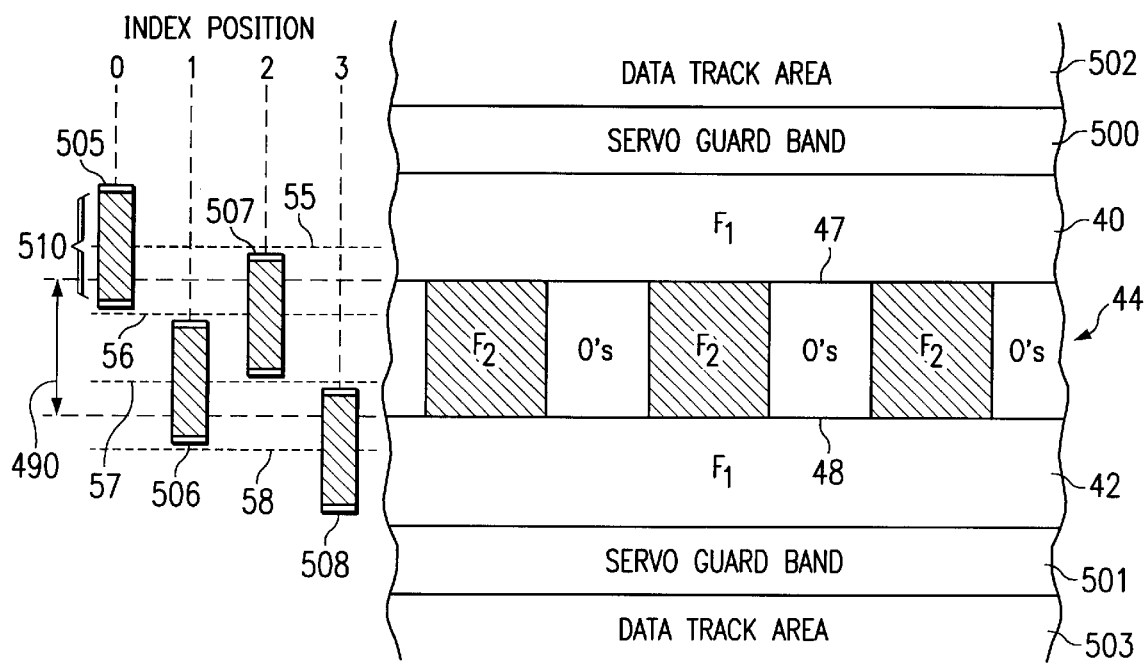
FIG. 3 is a detailed diagrammatic representation of a magnetic tape format providing four index servo positions in the servo track having two edges of FIG. 2.

Referring to FIG. 3, the servo tracks are typically generated by first recording the continuous frequency outer bands 40 and 42, and then recording the center bands 44 with the alternating burst and null patterns, the center bands erasing any overlap of the edges 47 or 48, providing a precise width between the edges. The precision of the edges is based on the photolithography of the recording heads providing the center bands, the constancy of the amplitudes of the recording signals for all the bands, the constancy of the recording media characteristics, e.g., from tape to tape and within a single tape, and the precision of the alignment between the recording medium (tape) and the recording heads. Each of these factors is subject to variation, leading to the possibility of some misalignments. The close proximity of the resultant data tracks to each other leads to a requirement that the servo system reduce misalignments, or variations in alignment while reading the servo tracks, to a minimum.

The present invention provides an initialization and calibration sequence that enables a more precise track following alignment of a servo head for following an index servo position displaced laterally from an edge.

Figure 5:
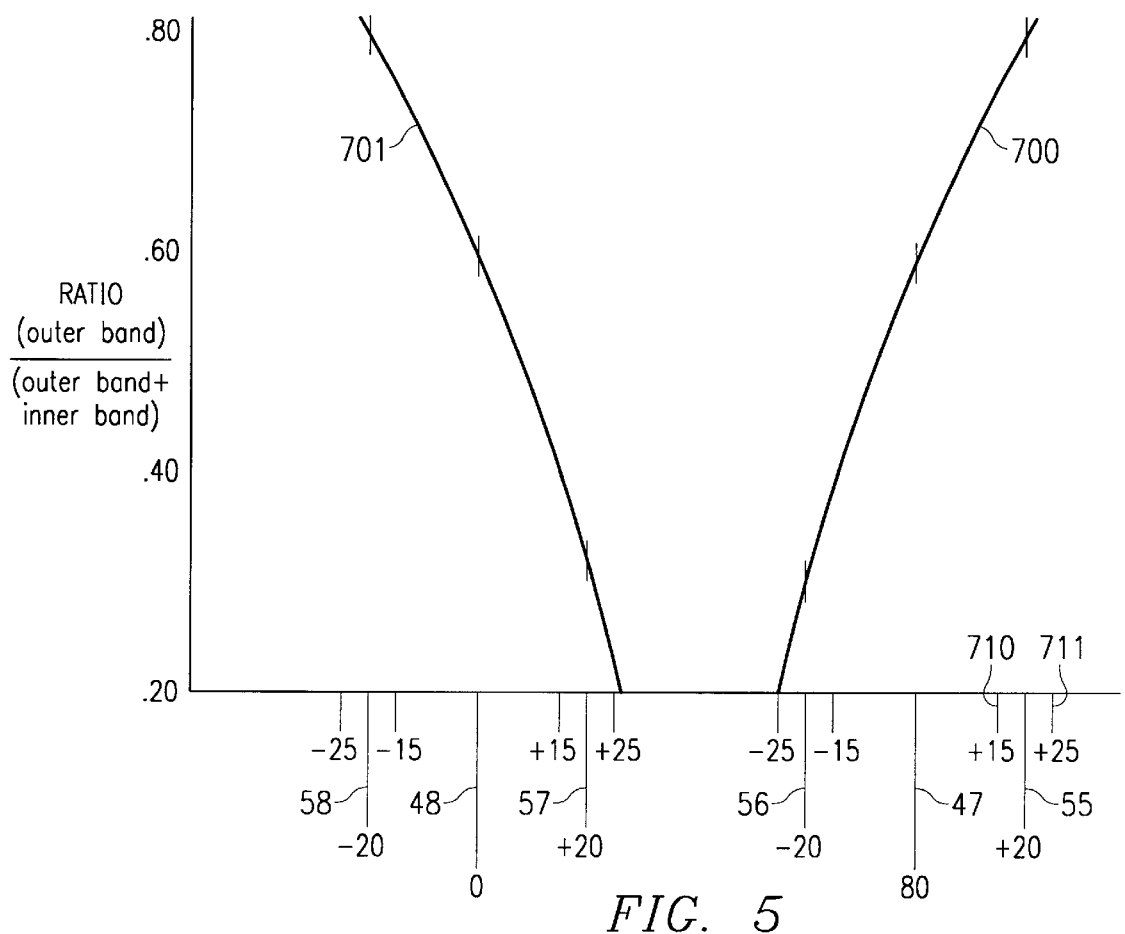
FIG. 5 is a graphical representation of a ratio related to the two dissimilar recorded servo signals as read by the servo head for various lateral displacements of the servo head.

FIG. 5 illustrates a ratio related to the two dissimilar recorded servo signals as determined by the servo detector, the ratio representing the lateral position of the servo head with respect to each of the edges. Thus, the trace 700 represents the ratios at different displacements with respect to one edge, and the trace 701 represents the ratios at different displacements with respect to the other edge. The ratio illustrated is the ratio of the outer band signal amplitude to the (outer band signal amplitude+the inner band signal amplitude). The lateral displacement of "0" represents the centered-on-edge ratio at one edge, such as the lower edge 48 in FIG. 3, and the lateral displacement of "80" represents the centered-on-edge ratio at the other edge, such as the upper edge 47 in FIG. 3. In the illustrated example, the predetermined distance between the edges is 80 microns. If no part of the servo head was on the inner band and the head was totally on an outer band, the ratio would be substantially 1.00, and, if the servo head were in the exact center of the inner band so that no part of either outer band was being read, the ratio would be substantially 0.00. The nominal alignment of the servo head at the centered-on-edge position "0" or "80" is approximately at a ratio of "0.60". Those of skill in the art will understand that many different specific dimensions may be employed, and many similar ratios may be designed, the illustrated ratio providing a high degree of sensitivity to displacement and low sensitivity to noise.

In the illustrated example, the index servo positions are displaced 20 microns from the edges, equal to 25% of the predetermined distance between the edges. Thus, index servo position 55 from FIG. 3 is at approximately +20 microns and index servo position 56 is at approximately 20 microns from edge 47, and index servo position 57 is at approximately +20 microns and index servo position 58 is at approximately −20 microns from edge 48. These servo positions, however, must be followed by a track following servo and not mechanically due to the substantial (in comparison to the small track spacings) lateral movements of the tape media and of the servo tracks on the tape media.

Referring to FIGS. 1, 3 and 5, in accordance with an embodiment of the present invention, servo logic 465 is provided with a database 705 and is coupled to the servo detector 28, the servo track follower 24 and the independent position sensor 460. The servo logic 465 employs the servo detector 28, while operating the servo track follower 24 to move the servo head laterally into a position at which the servo detector provides a ratio representing one of the edges, nominally aligning the servo head at a lateral position representing one of the edges 47 or 48. The independent position sensor will have provided a coarse position in accordance with the incorporated (Ser. No. 09/413,327) application which indicated which of the edges is detected. At the nominal alignment of the servo head at the edge detected by the servo detector, the logic 465 measures the mechanical lateral position of the independent position sensor 460. The logic then responds to the independent position sensor, operating the servo track follower to reposition the servo head laterally the redetermined displacement distance from the nominal alignment as determined by the independent position sensor 460. The logic 465 then measures the repositioned ratio of the servo signals at the displaced distance as provided by the servo detector. Thus, one of the index servo positions will have been identified, and the servo signal ratio at the identified position comprises the index ratio. The logic 465 initializes and calibrates the servo track follower to employ the provided repositioned ratio as the index ratio. Thus, track following the provided index ratio insures that the servo head is at the correct displacement from the edge, e.g., at index position 510 of FIG. 3.

Additionally referring to FIG. 4, the servo system may comprise a plurality of servo heads 520–522 having the same alignment as a plurality of the prerecorded servo tracks 525–527. The nominal alignment of the servo heads at the corresponding edges comprises aligning the servo heads at a lateral position at which the servo detector provided ratio comprises the average of the provided ratios from the plurality of servo heads, the average representing the corresponding edges of the servo tracks. Then, the measurement of the repositioned ratio of the servo signals comprises measuring the average of the servo detector provided repositioned ratios from the plurality of servo heads 520–522.

In accordance with another embodiment of the present invention, and referring to FIGS. 1, 3 and 5, a check on the edge measurement, e.g., of edge 47, may be made during the initialization and calibration of the index servo positions. Subsequent to repositioning the head 20 the lateral displacement distance to one lateral position, e.g., index position 510 and reading the servo signals from path 55, the servo head is again repositioned in the opposite lateral direction from that of the repositioning step, to the predetermined displacement distance from the nominal alignment as determined by the independent position sensor 460, e.g., to index position 507. The logic 465 measures the again repositioned ratio of the servo signals along the displaced path 56. Thus, the repositioned ratio represents the displacement at one side of the edge on path 55, and the again repositioned ratio represents the displacement at the other side of the edge on path 56. The logic determines a midpoint between the repositioned ratio and the again repositioned ratio, compares the midpoint to the nominally aligned ratio, and determines whether the compared ratios are within a predetermined range. If so, the nominal alignment was correct, and the logic initializes and calibrates the servo detector to employ the provided repositioned ratio and the again repositioned ratio as the index ratios for the oppositely displaced index servo positions.

The repositioned locations can also be checked in accordance with the present invention. As a check, the servo head is further repositioned laterally in opposite directions from the repositioned displacement, the further repositioning comprising a substantially equal displacement in the opposite directions, the displacement a fraction of the predetermined displacement distance as determined by the independent position sensor. In FIG. 5, the further repositioning is at locations 710 and 711 for servo path 55. The logic measures the servo detector provided ratios of the servo signals at the further repositioned displacements, and determines a further midpoint between the opposite further repositioned ratios. The logic compares the further midpoint to the repositioned ratio, determining whether the compared ratios are within a predetermined range of each other. If so, the repositioned ratio is correct, and the logic conducts the initializing and calibrating step.

Those of skill in the art will understand that other spacings and specific positionings of the servo head may be employed in accordance with the present invention.

Thus, the present invention provides an initialization and calibration sequence that enables a more precise track following alignment of a servo head for following indexed servo positions displaced laterally from one or more edges.

Figure 6A:
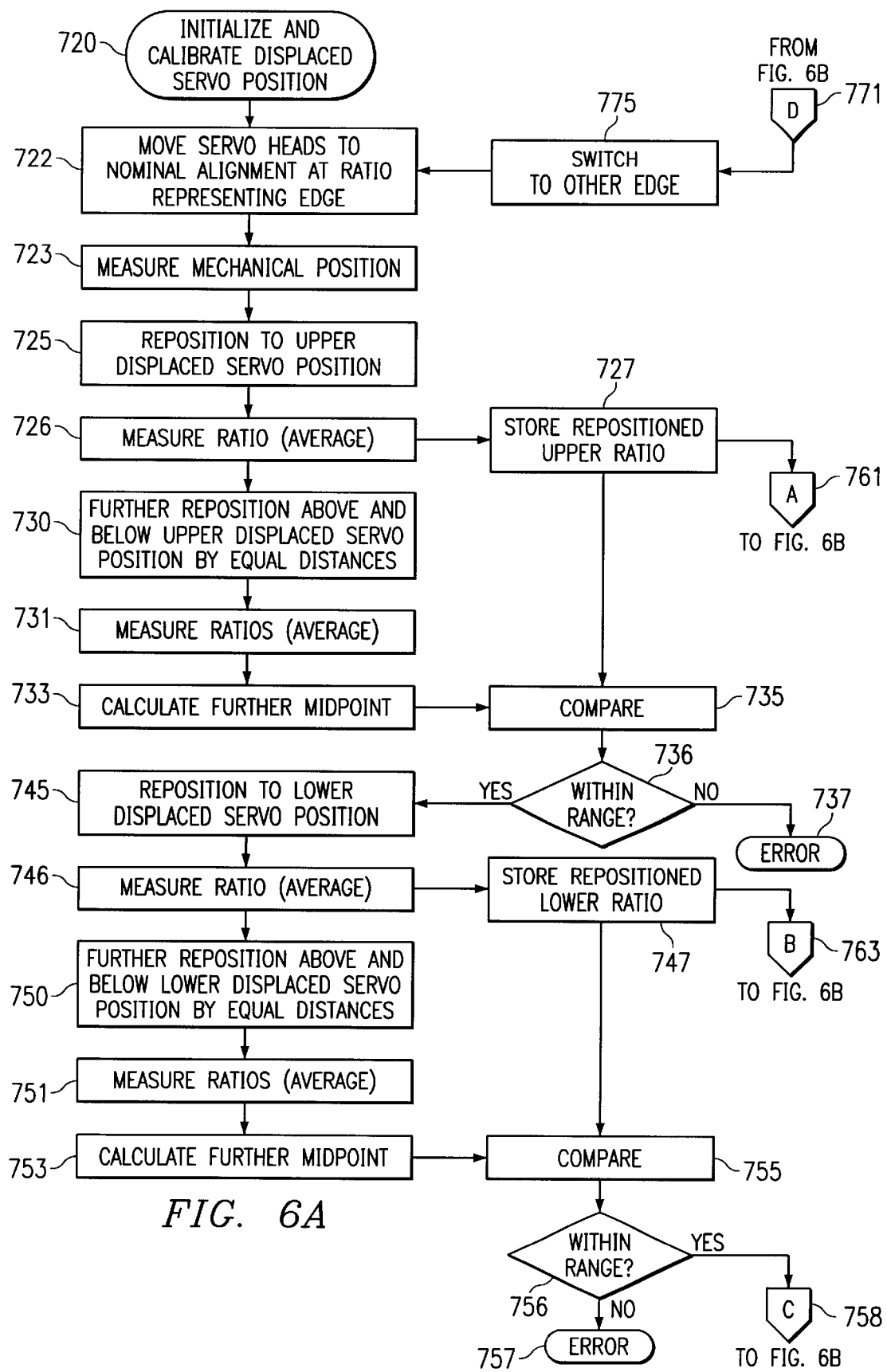
FIGS. 6A and 6B are flow charts depicting an embodiment of the method of the present invention for initializing and calibrating displaced servo positions, such as those of FIG. 3.
Figure 6B:
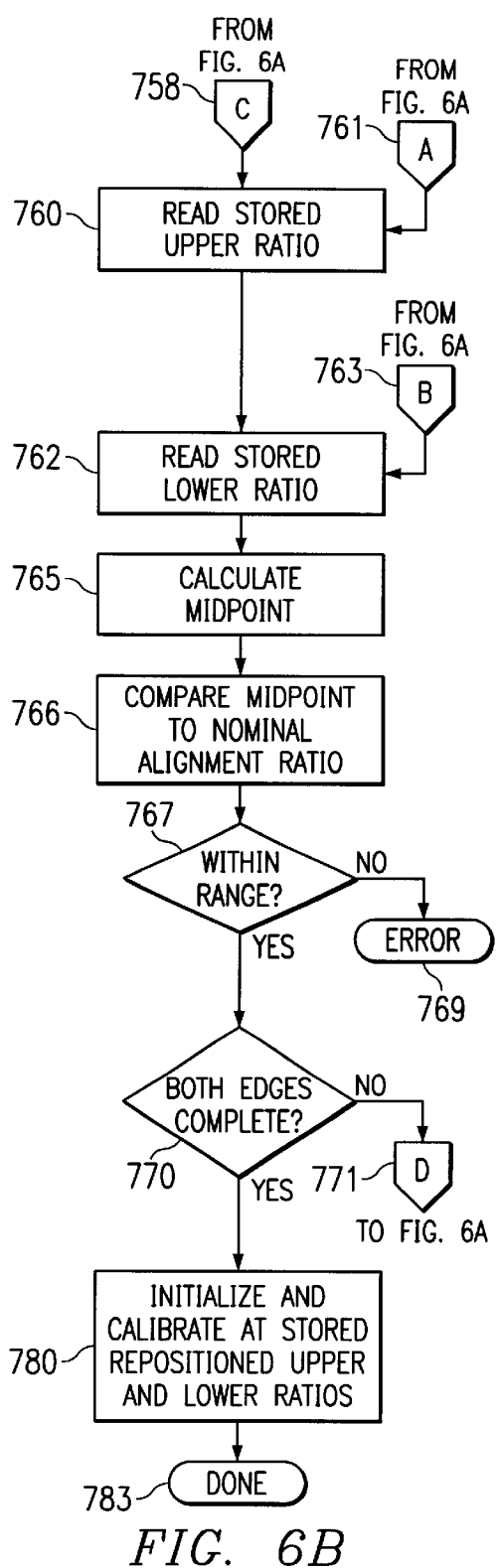

FIGS. 6A and 6B are flow charts depicting an embodiment of the method of the present invention for initializing and calibrating displaced servo positions, such as those of FIG. 3, beginning at step 720.

Referring additionally to FIGS. 1, 3 and 5, in step 722, the servo heads, e.g., heads 520–522 of FIG. 4, are moved by the servo track follower 24 to the point of nominal alignment at the ratio from servo detector 28 that represents an edge, e.g., edge 47. The logic 465 then, in step 723, reads the mechanical position of the head from independent position sensor 460. The logic, in step 725, operates the servo track follower 24 to reposition the servo head to one of the displaced servo positions, e.g., an upper displaced servo position 55, the mechanical displacement as measured by the independent position sensor 460.

In step 726, the ratio, e.g., comprising the average of the servo heads, provided by the servo detector 28, is measured. The measured ratio is stored in, e.g., database 705, by logic 465 in step 727.

Next, in step 730, the measurement of the upper displaced servo position 55 is checked for accuracy. The servo head is further repositioned laterally in opposite directions from the repositioned displacement, the further repositioning comprising a substantially equal displacement in the opposite directions, the displacement a fraction of the predetermined displacement distance as determined by the independent position sensor 460. In FIG. 5, the further repositioning is at locations 710 and 711 for servo path 55. In step 731, the logic 465 measures the servo detector provided ratios of the servo signals at the further repositioned displacements, and, in step 733, determines a further midpoint between the opposite further repositioned ratios. In step 735, the repositioned ratio stored in step 727 is compared by the logic to the further midpoint of step 733. In step 736, the logic 465 determines whether the compared ratios are within a predetermined range of each other. If not, the repositioned ratio may be incorrect, and step 737 indicates that there is an error. If so, the repositioned ratio is correct, and the logic will conduct the initialization and calibration, after determining the other three repositioning ratios for the two edges.

Next, in steps 745–756, the steps 725–736 are repeated for the other displaced servo path, e.g., path 56. Briefly, the logic, in step 745, operates the servo track follower 24 to reposition the servo head to the other of the displaced servo positions, e.g., lower displaced servo position 56, as measured by the mechanical displacement measured by the independent position sensor 460. In step 746, the ratio from the servo detector 28, e.g., comprising the average of the servo heads, is measured. The measured ratio is stored in, e.g., database 705, by logic 465 in step 747. In step 750, the measurement of the lower displaced servo position 55 is checked for accuracy. The servo head is further repositioned laterally in opposite directions from the repositioned displacement, the further repositioning comprising a substantially equal displacement in the opposite directions as above as determined by the independent position sensor 460. In step 751, the logic 465 measures the servo detector provided ratios of the servo signals at the further repositioned displacements, and, in step 753, determines a further midpoint between the opposite further repositioned ratios. In step 755, the repositioned ratio stored in step 747 is compared by the logic to the further midpoint of step 753. In step 756, the logic 465 determines whether the compared ratios are within a predetermined range of each other. If the compared ratios are not within the predetermined range of each other, the repositioned ratio may be incorrect, and step 757 indicates that there is an error. If so, the repositioned ratio is correct, and the logic will conduct the initialization and calibration, after determining the repositioning ratios for the other one of the edges.

First, however, the one edge, e.g., edge 47, may be checked or accuracy. Connector 758 leads to FIG. 6B and, in step 760, he logic 465 reads the repositioned ratio for one index position, e.g., the upper index position 55, stored in the database 705 at step 727. This is shown by means of connector 761. Similarly, in step 762, the logic 465 reads the ratio for the again repositioned ratio for the other index position, e.g., lower index position 56, stored in the database 705 at step 747, as shown by connector 763. In step 765, the midpoint between the repositioned and again repositioned index positions is determined. Then, in step 766, the logic 766 compares the nominal alignment ratio initially used in step 722 to the midpoint determined in step 765. Step 767 determines whether the compared midpoint and nominally aligned ratios are within a predetermined range. If not, the original nominal alignment may be incorrect, and an error is indicated in step 769. If so, the nominal alignment was correct, and the logic may initialize and calibrate the servo system to employ the provided repositioned ratio and the again repositioned ratio as the index ratios for the oppositely displaced index servo positions of the one edge, e.g., edge 47.

Step 770 determines if the index ratios for both edges have been determined. If not, the other edge, e.g., edge 48, must be initialized and calibrated. Thus, connector 771 returns to FIG. 6A. Logic 465, in step 775, switches from the one edge, e.g., edge 47, to the other edge of the servo track, e.g., edge 48.

Then, the logic repeats steps 722–769 to determine the index ratios for displaced index positions 57 and 58 at opposite sides of edge 48, and to test the ratios for the index positions and test the original positioning of edge 48.

Upon completing both edges, step 770 indicates that the ratios for the displaced index positions for both of the edges have been identified, and, in step 780, the logic initializes and calibrates the servo system to employ the provided repositioned ratio and the again repositioned ratio for each of the edges as the index ratios for the oppositely displaced index servo positions of the two edges, e.g., edge 47 and edge 48, and step 783 indicates that the initialization and calibration are complete. The ratios may be placed in a lookup table for each index position, the lookup table stored, e.g., in database 705.

Those of skill in the art will understand that the specific steps of the method may be varied and that steps or groups of steps may be arranged in differing sequences. The method of the present invention thus provides an initialization and calibration sequence that enables a more precise track following alignment of a servo head for following an index servo position displaced laterally from an edge.

As discussed above, the dissimilar servo signals that are prerecorded onto the media to form the edges are subject to variation in amplitude from one data storage media to the next. A result of the variation in amplitude may be that the either the inner band is at a greater amplitude than the outer bands, erroneously indicating that the inner band is wider at the nominal ratios of the edges, or the outer bands are at a greater amplitude, erroneously indicating that the inner band is narrower at the nominal ratios of the edges.

Figure 7:
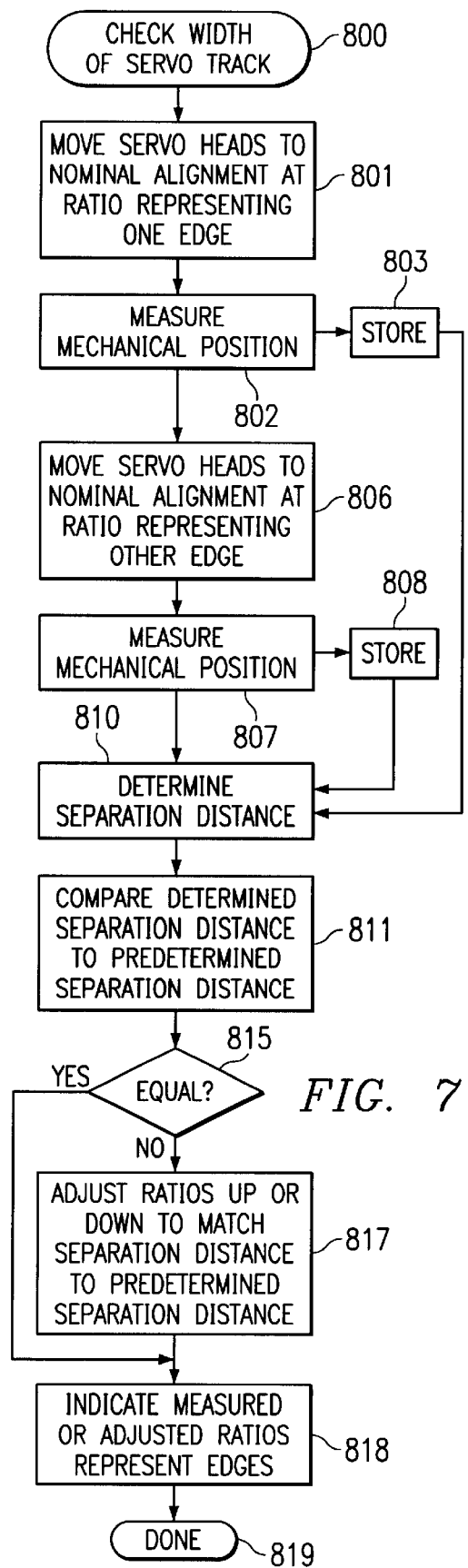
FIG. 7 is a flow chart depicting an embodiment of the method of the present invention for checking the width of a servo track, such as that of FIG. 3, in accordance with the method of FIGS. 6A and 6B.

The method illustrated in FIG. 7 provides an embodiment of a method to check on the accuracy of the width of the inner band, or the spacing of the edges, as indicated by the nominal ratios of step 722 of FIG. 6A for each edge. Referring additionally to FIGS. 1, 3 and 5, the logic 465 employs the independent servo positioner 460 to measure the actual mechanical displacement between the edges as indicated by the nominal ratios selected, e.g., from a lookup table, beginning at step 800. This test may be conducted either prior to or subsequent to the process of FIGS. 6A and 6B. If the test indicates that the original nominal ratios are incorrect, the process of FIGS. 6A and 6B must be repeated with the correct nominal edges.

The test comprises first, in step 801, moving the servo heads 520–522 to the nominal alignment at the ratio representing one edge, e.g., edge 47. In step 802., the mechanical position of the head 20 is measured as indicated by the independent position sensor 460. These are the same steps as steps 722 and 723 in FIG. 6A. The measured independent position is stored, e.g., in database 705, in step 803. Then, the logic 465 operates the servo track follower 24 to move the servo heads to the nominal alignment at the ratio representing the other edge, e.g., edge 48, in step 806, and, in step 807, measures the mechanical position of the head 20 is measured as indicated by the independent position sensor 460. Again, these are the same steps as steps 722 and 723 in FIG. 6A. In step 808, the measured independent position is stored.

In step 810, the logic 465 determines the separation distance between the mechanical positions of the head stored in steps 803 and 808. Then, in step 811, the logic compares the separation distance determined in step 810 to the predetermined distance, e.g., 80 microns in the example of FIG. 5. Step 815 determines whether the distances compared in step 811 are equal, or substantially equal, and, if not, in step 817, adjusts the ratios up or down to match the separation distance between the edges as indicated by the ratios to the predetermined distance. This may be accomplished by using a lookup table having the points as shown in FIG. 5, and adjusting the nominal alignment ratios along the curve by the amounts required to compensate for the error in distance. The precise methodology of accomplishing the adjustment may be altered by those of skill in the art.

In step 818, the logic 465 indicates the measured or the adjusted ratios as representing the nominal ratios representing the edges. The ratios may be supplied to and stored by a lookup table in database 705. The process is thus completed at step 819.

FIGS. 8, 9, 10A and 10B illustrate an embodiment of a servo detector 28 in accordance with the incorporated (Ser. No. 09/413,327) application. Briefly, referring to FIG. 8, the analog servo signals are read at the servo element of head 20, and the servo detector 28 converts the analog servo signals to asynchronous digital samples of the signal in analog front end 65 and a digital servo track decoder 66 decodes the digital samples and determines the amplitudes of the envelopes of the minimum and the maximum signals represented by the digital samples.

Figure 8:
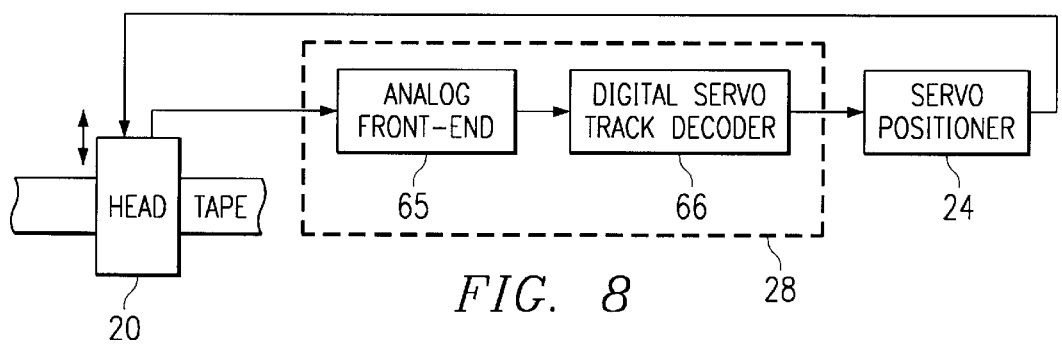
FIGS. 8 and 9 illustrate a servo detector for detecting the dissimilar servo signals of the tracks of FIG. 3.
Figure 9:
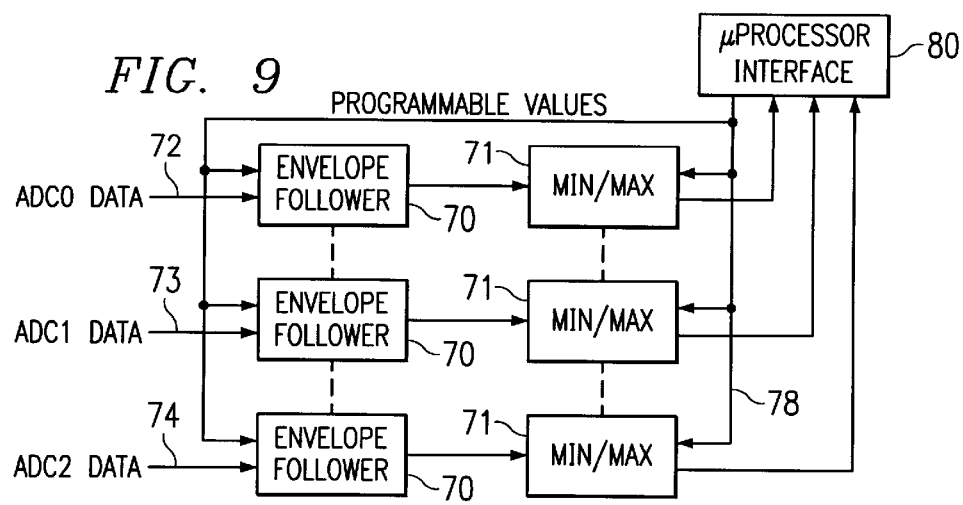

In FIG. 9, illustrates a plurality of the digital servo track decoders of FIG. 8, each comprising an envelope follower 70 and a minimum/maximum detector 71. Each of the envelope followers 70 receives the asynchronous digital samples of a different servo element from an associated analog front end on a respective line 72–74.

In accordance with the incorporated (Ser. No. 09/413,327) application, various media, such as magnetic tape having different magnetic characteristics, or having different servo or data track densities, may be utilized by providing different programmable values on lines 78 for the servo track decoders, either by the control unit 12 of FIG. 1, or by a separate microprocessor, at microprocessor interface 80. A switch 82 operates multiplexors 83 to provide the appropriate decoded positioning information to the servo logic 465.

Figure 10A:
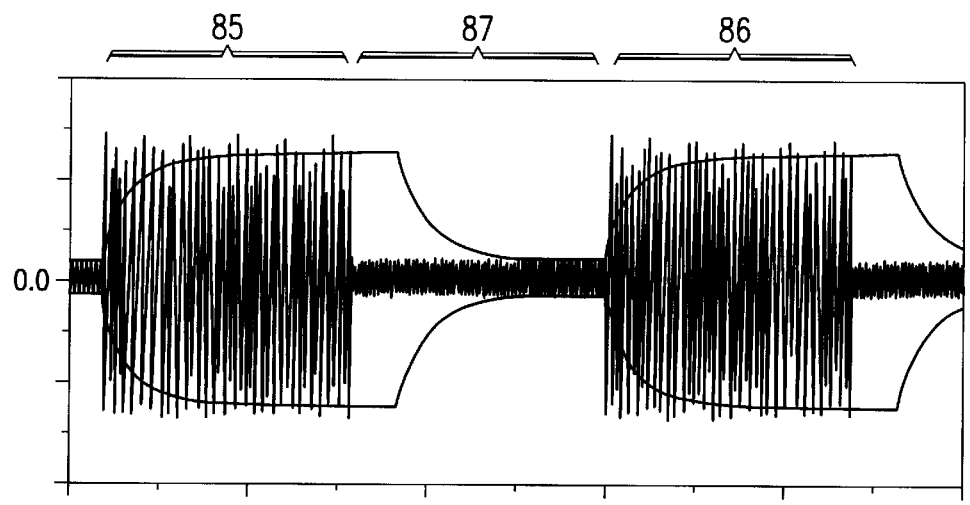
FIGS. 10A and 10B illustrate exemplary analog servo signals for different positions of a servo head at a track of FIG. 3 and examples of the digital envelopes of the respective analog servo signals generated by a servo detector of FIGS. 7 and 8.
Figure 10B:
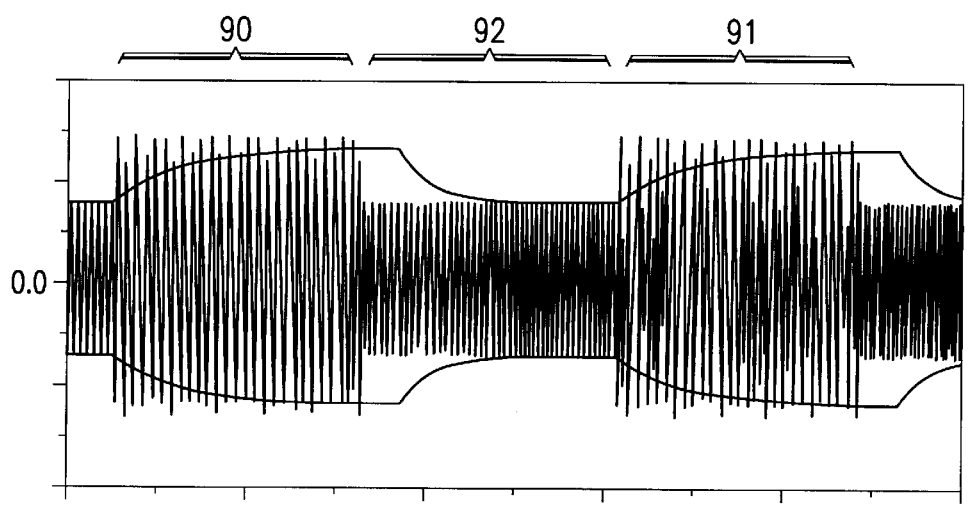

FIGS. 10A and 10B illustrate wave forms of the analog signal from the servo transducer at, respectively, positions 506 and 508 of FIG. 3. Thus, in FIG. 10A, the bursts 85 and 86 formed while the servo transducer is at position 506 of FIG. 3 from the combination of the first frequency and the second frequency burst is at a high amplitude, but the burst 87 formed from the combination of the first frequency and the null signal is at a very low amplitude because only a small portion of the servo transducer is positioned over the first frequency. In FIG. 10B, the bursts 90 and 91 formed while the servo transducer is at position 508 of FIG. 3 from the combination of the first frequency and the second frequency burst is at a high amplitude, as is the burst 92 formed from the combination of the first frequency and the null signal, because the servo transducer is positioned primarily over the first frequency. The incorporated (Ser. No. 09/413,327) application the parent invention digitally distinguishes the bursts and then provides the amplitudes of the envelopes of the respective bursts so that the ratio may be determined. The digital servo detector in the analog front end 65 asynchronously samples the signals read by the servo head. An envelope follower 70 receives the asynchronous digital samples, detecting and providing a maximum envelope output measuring the amplitude of a burst envelope of the maximum of the asynchronous digital samples, and detecting and providing a minimum envelope output measuring the amplitude of a burst envelope of the minimum of the asynchronous digital samples. A "DROPOUT" threshold detector receives the asynchronous digital samples and detects the received asynchronous digital samples failing to meet a "DROPOUT" threshold related to the maximum burst envelope, providing a "DROPOUT" threshold detection signal. An "ACQUIRE" detector responds to the "DROPOUT" threshold detection to detect the minimum envelope for the envelope detector, which provides the minimum envelope output. The "DROPOUT" detection distinguishes the minimum envelope from the maximum envelope and allows measurement of the minimum envelope in minimum/maximum logic 71. Thus, a ratio of the measured maximum envelope amplitude output and the measured minimum envelope amplitude output represents the lateral position of the servo head. This ratio is employed by the servo detector to provide the ratio as required by the logic 465.

Figure 11:
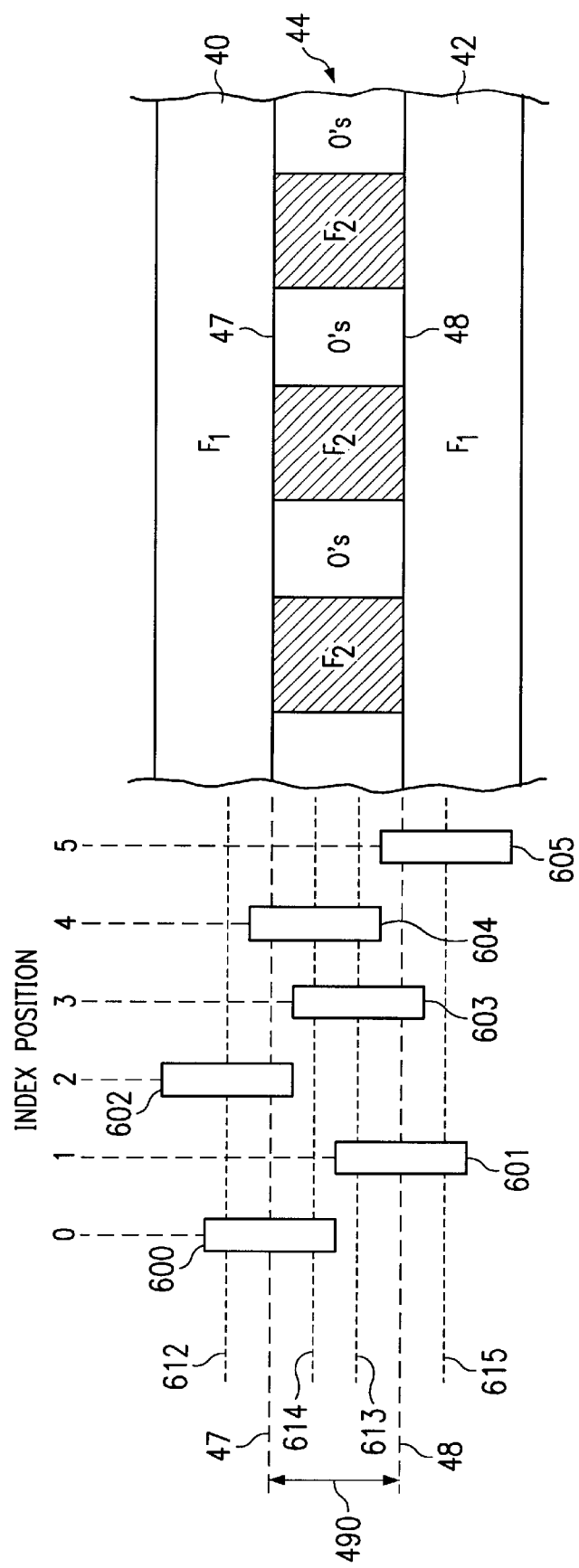
FIG. 11 is a detailed diagrammatic representation of a magnetic tape format providing six index servo positions in the servo track having two edges of FIG. 2.

FIG. 11 illustrates another embodiment of displaced index positions that may be employed with the present invention. At the "0" or "1" index positions, the servo element is located at position 600 centered on servo edge 47 or at position 601 centered on servo edge 48. Additional index positions are provided which are aligned such that a servo element is displaced from an edge 47 or 48 located along lines 612–615 about ⅓ the width of the middle track 44 away from the servo edge 47 or 48 in either direction. As the result, the number of index positions becomes six. In order to center the data read/write elements in the "2" and "5" index positions, the servo read element must be located at position 602 or at position 605, and will read a minimum signal that has an amplitude of about ⅚ of the maximum signal, and to center the data read/write elements in the "3" and "4" index positions, the servo read element must be located at position 603 or at position 604, and will read a minimum signal that has an amplitude of about ⅙ of the maximum signal. Thus, the servo detector 28 and servo logic 465 will utilize differing sets of ratios for determining the displacements of the servo index positions, and will utilize the on-edge position for the edges. The on-edge positions are known, but the steps of the present invention are required to determine the displacements of the laterally displaced index positions.

Other arrangements of the servo index positions may be envisioned by those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method in a servo system for initializing and calibrating at least one index servo position of at least one servo head with respect to at least one servo track prerecorded on a recording medium; said prerecorded servo track having at least two edges, each said edge comprising an interface between two dissimilar recorded servo signals, said edges on opposite lateral sides of an inner said recorded servo signal, said edges separated by a predetermined separation distance; said at least one index servo position substantially parallel to said edges and displaced a predetermined displacement distance in a lateral direction from one of said edges; said servo head moveable in said lateral direction with respect to said recording medium; said servo system having a servo detector for determining a ratio related to said two dissimilar recorded servo signals as read by said servo head, said ratio representing said lateral position of said servo head with respect to one of said edges, said servo system moving said servo head laterally to achieve an index ratio of said two dissimilar recorded servo signals representing said index servo position; and said servo system having an independent position sensor for determining the mechanical lateral position of said servo head with respect to said recording medium; said method comprising the steps of:

nominally aligning said servo head at a lateral position at which said servo detector provided ratio represents one of said edges;

measuring said mechanical lateral position of said independent position sensor at said nominal alignment of said servo head;

repositioning said servo head laterally said predetermined displacement distance from said nominal alignment as determined by said independent position sensor;

measuring said servo detector provided repositioned ratio of said servo signals; and initializing and calibrating said servo system to employ said provided repositioned ratio as said index ratio.

2. The method of claim 1, wherein said servo system comprises a plurality of said servo heads having the same alignment as a plurality of said prerecorded servo tracks; and wherein said nominally aligning step comprises aligning said servo heads at a lateral position at which said servo detector provided ratio comprises the average of said provided ratios from said plurality of servo heads representing said one of said edges of said plurality of servo tracks.

3. The method of claim 2, wherein said step of measuring said repositioned ratio of said servo signals comprises measuring the average of said servo detector provided repositioned ratios from said plurality of servo heads.

4. The method of claim 1, for initializing and calibrating said index servo positions displaced substantially equidistant in opposite lateral directions from one of said edges, comprising the additional steps of:

again repositioning said servo head in said opposite lateral direction from said repositioning step said predetermined displacement distance from said nominal alignment as determined by said independent position sensor;

measuring said servo detector provided again repositioned ratio of said servo signals;

determining a midpoint between said repositioned ratio and said again repositioned ratio;

comparing said midpoint to said nominally aligned ratio; and upon said comparison step indicating said compared ratios are within a predetermined range, initializing and calibrating said servo detector to employ said provided repositioned ratio and said again repositioned ratio as said index ratios for said oppositely displaced index servo positions.

5. The method of claim 1, additionally comprising the steps of:

further repositioning said servo head laterally in opposite directions from said repositioned displacement, said further repositioning comprising a substantially equal displacement in said opposite directions, said displacement a fraction of said predetermined displacement distance as determined by said independent position sensor;

measuring said servo detector provided ratios of said servo signals at said further repositioned displacements;

determining a further midpoint between said opposite further repositioned ratios;

comparing said further midpoint to said repositioned ratio; and upon said comparison step indicating said compared ratios are within a predetermined range of each other, conducting said initializing and calibrating step.

6. The method of claim 1, wherein said nominal lateral position representing said one of said edges is defined by a lookup table of lateral positions vs. servo detector provided ratios.

7. The method of claim 1, additionally comprising the steps of:

further repositioning said servo head laterally in opposite directions from said repositioned displacement, said further repositioning comprising a substantially equal displacement in said opposite directions, said displacement a fraction of said predetermined displacement distance as determined by said independent position sensor;

measuring said servo detector provided ratios of said servo signals at said further repositioned displacements;

determining whether said repositioned ratio is between said opposite further repositioned ratios; and upon said determination step indicating said repositioned ratio is between said opposite further repositioned ratios, conducting said initializing and calibrating step.

8. The method of claim 1, additionally:

conducting said nominal alignment and mechanical lateral position measuring steps for the other of said two edges of said prerecorded servo track, said other edge on said opposite lateral side of said inner recorded servo signal;

comparing the separation distance between said mechanical lateral position of said independent position sensor at said nominal alignment of said servo head of both said nominal alignments, to said predetermined separation distance;

adjusting said mechanical lateral positions to provide both said predetermined separation distance and equal said measured ratios of said servo detector provided ratios of said servo signals; and indicating said equal measured ratios as comprising said nominally aligned ratios representing said respective opposite edges.

9. The method of claim 1, wherein separate said index servo positions are displaced substantially equidistant in opposite lateral directions from and at opposite sides of each of said two edges, comprising four said index servo positions, and wherein said method initializes and calibrates said four index servo positions, comprising the additional steps of:

conducting said nominal alignment and mechanical lateral position measuring steps for the other of said two edges of said prerecorded servo track, said other edge on said opposite lateral side of said inner recorded servo signal;

repositioning said servo head laterally said predetermined displacement distance from said nominal alignment of said other of said two edges as determined by said independent position sensor;

measuring said servo detector provided repositioned ratio of said servo signals;

again repositioning said servo head in said opposite lateral direction from said repositioning step said predetermined displacement distance from said nominal alignment as determined y said independent position sensor, separately with respect to said one edge, and with respect to said other edge;

measuring said servo detector provided again repositioned ratio of said servo signals, separately with respect to said one edge, and with respect to said other edge; and initializing and calibrating said servo detector to employ said provided repositioned ratio and said again repositioned ratio separately for said one edge and said other edge as said index ratios for said oppositely displaced index servo positions.

10. The method of claim 9, wherein said servo system comprises a plurality of said servo heads having the same alignment as a plurality of said prerecorded servo tracks; and wherein said nominally aligning steps comprise separately aligning said servo heads at a lateral position at which said servo detector provided ratio comprises the average of said provided ratios from said plurality of servo heads representing said one of said edges of said plurality of servo tracks, and at a lateral position representing said other of said edges.

11. The method of claim 10, wherein said steps of separately measuring said repositioned ratios of said servo signals, and of separately measuring said again repositioned ratios, comprise measuring the average of said servo detector provided repositioned ratios from said plurality of servo heads.

12. The method of claim 10, wherein said index servo predetermined displacement distance comprises substantially 25% of said predetermined separation distance.

13. The method of claim 1, wherein said two dissimilar recorded servo signals comprise respectively, a constant amplitude signal of a single first frequency comprising the outer servo signal of each of said edges, and an inner servo signal alternating between a constant amplitude burst signal of a single second frequency and a zero amplitude null signal; and wherein said nominally aligned edge ratio determined by said servo detector comprises said combined amplitude of said single first frequency and said null signal substantially equaling 0.6 of said combined amplitude of said single first frequency and said single second frequency.

14. A servo system for initializing and calibrating at least one index servo track following position related to at least one servo track prerecorded on a recording medium; said prerecorded servo track having at least two edges, each said edge comprising an interface between two dissimilar recorded servo signals, said edges on opposite lateral sides of an inner said recorded servo signal, said edges separated by a predetermined separation distance; said at least one index servo position substantially parallel to said edges and displaced a predetermined displacement distance in a lateral direction from one of said edges; comprising:

at least one servo head moveable in said lateral direction with respect to said recording medium;

a servo detector coupled to said at least one servo head for determining a ratio related to said two dissimilar recorded servo signals as read by said servo head, said ratio representing said lateral position of said servo head with respect to one of said edges;

a servo track follower coupled to said servo detector for moving said servo head laterally, said servo track follower, once initialized and calibrated, following an index ratio of said two dissimilar recorded servo signals representing said index servo position;

an independent position sensor for determining the mechanical lateral position of said servo head with respect to said recording medium; and logic coupled to said servo detector, said servo track follower and said independent position sensor; said logic responding to said servo detector and operating said servo track follower to nominally align said servo head at a lateral position at which said servo detector provided ratio represents one of said edges; said logic measuring said mechanical lateral position of said independent position sensor at said nominal alignment of said servo head; said logic responding to said independent position sensor, operating said servo track follower to reposition said servo head laterally said predetermined displacement distance from said nominal alignment as determined by said independent position sensor; said logic measuring said servo detector provided repositioned ratio of said servo signals; and said logic initializing and calibrating said servo track follower to employ said provided repositioned ratio as said index ratio.

15. The servo system of claim 14, comprising a plurality of said servo heads having the same alignment as a plurality of said prerecorded servo tracks; and wherein said logic nominally aligns said servo heads at a lateral position at which said servo detector provided ratio comprises the average of said provided ratios from said plurality of servo heads representing said one of said edges of said plurality of servo tracks.

16. The servo system of claim 15, wherein said logic measures said repositioned ratio of said servo signals, determining the average of said measured servo detector provided repositioned ratios from said plurality of servo heads.

17. The servo system of claim 14, for initializing and calibrating said index servo positions displaced substantially equidistant in opposite lateral directions from one of said edges, wherein said logic additionally:

operates said servo track follower to again reposition said servo head in said opposite lateral direction from said repositioning, said again repositioning to said predetermined displacement distance from said nominal alignment as determined by said independent position sensor;

measures said servo detector provided again repositioned ratio of said servo signals;

determines a midpoint between said repositioned ratio and said again repositioned ratio;

compares said midpoint to said nominally aligned ratio; and upon said comparison indicating said compared ratios are within a predetermined range, initializes and calibrates said servo detector to employ said provided repositioned ratio and said again repositioned ratio as said index ratios for said oppositely displaced index servo positions.

18. The servo system of claim 14, wherein said logic additionally:

operates said servo track follower to further reposition said servo head laterally in opposite directions from said repositioned displacement, said further repositioning comprising a substantially equal displacement in said opposite directions, said displacement a fraction of said predetermined displacement distance as determined by said independent position sensor;

measures said servo detector provided ratios of said servo signals at said further repositioned displacements;

determines a further midpoint between said opposite further repositioned ratios;

compares said further midpoint to said repositioned ratio; and upon said comparison indicating said compared ratios are within a predetermined range of each other, initializing and calibrating said servo track follower to employ said provided repositioned ratio as said index ratio.

19. The servo system of claim 14, additionally comprising a lookup table of lateral positions vs. servo detector provided ratios, said lookup table defining said nominal lateral position representing said one of said edges for said logic.

20. The servo system of claim 14, wherein said logic additionally:

operates said servo track follower to further reposition said servo head laterally in opposite directions from said repositioned displacement, said further repositioning comprising a substantially equal displacement in said opposite directions, said displacement a fraction of said predetermined displacement distance as determined by said independent position sensor;

measures said servo detector provided ratios of said servo signals at said further repositioned displacements;

determines whether said repositioned ratio is between said opposite further repositioned ratios; and upon said determination indicating said repositioned ratio is between said opposite further repositioned ratios, initializing and calibrating said servo track follower to employ said provided repositioned ratio as said index ratio.

21. The servo system of claim 14, wherein said logic additionally:

operates said servo track follower to conduct said nominal alignment, and conducts said mechanical lateral position measurement for the other of said two edges of said prerecorded servo track, said other edge on said opposite lateral side of said inner recorded servo signal;

compares the separation distance between said mechanical lateral position of said independent position sensor at said nominal alignment of said servo head of both said nominal alignments, to said predetermined separation distance;

adjusts said mechanical lateral positions to provide both said predetermined separation distance and equal said measured ratios of said servo detector provided ratios of said servo signals; and indicates said equal measured ratios as comprising said nominally aligned ratios representing said respective opposite edges.

22. The servo system of claim 14, wherein separate said index servo positions are displaced substantially equidistant in opposite lateral directions from and at opposite sides of each of said two edges, comprising four said index servo positions, and wherein said servo system initializes and calibrates said four index servo positions, said logic additionally:

operates said servo track follower to conduct said nominal alignment, and conducts said mechanical lateral position measurement for the other of said two edges of said prerecorded servo track, said other edge on said opposite lateral side of said inner recorded servo signal;

operates said servo track follower to reposition said servo head laterally said predetermined displacement distance from said nominal alignment of said other of said two edges as determined by said independent position sensor;

measures said servo detector provided repositioned ratio of said servo signals;

operates said servo track follower to again reposition said servo head in said opposite lateral direction from said repositioning, said again repositioning to said predetermined displacement distance from said nominal alignment as determined by said independent position sensor, separately with respect to said one edge, and with respect to said other edge;

measures said servo detector provided again repositioned ratio of said servo signals, separately with respect to said one edge, and with respect to said other edge; and initializes and calibrates said servo detector to employ said provided repositioned ratio and said again repositioned ratio separately for said one edge and said other edge as said index ratios for said oppositely displaced index servo positions.

23. The servo system of claim 22, comprising a plurality of said servo heads having the same alignment as a plurality of said prerecorded servo tracks; and wherein said logic operates said servo track follower to conduct said nominal alignments, separately aligning said servo heads at a lateral position at which said servo detector provided ratio comprises the average of said provided ratios from said plurality of servo heads representing said one of said edges of said plurality of servo tracks, and at a lateral position representing said other of said edges.

24. The servo system of claim 23, wherein said logic, in separately measuring said repositioned ratios of said servo signals, and in separately measuring said again repositioned ratios, comprises measuring the average of said servo detector provided repositioned ratios from said plurality of servo heads.

25. The servo system of claim 23, wherein said index servo predetermined displacement distance comprises substantially 25% of said predetermined separation distance.

26. The servo system of claim 14, wherein said two dissimilar recorded servo signals comprise respectively, a constant amplitude signal of a single first frequency comprising the outer servo signal of each of said edges, and an inner servo signal alternating between a constant amplitude burst signal of a single second frequency and a zero amplitude null signal; and wherein said nominally aligned edge ratio determined by said servo detector comprises said combined amplitude of said single first frequency and said null signal substantially equaling 0.6 of said combined amplitude of said single first frequency and said single second frequency.

* * * * *